United States Patent [19]
McClung

[11] 4,069,891
[45] Jan. 24, 1978

[54] OBSERVATION STAND

[76] Inventor: Thomas Arthur McClung, Rte. 5, Circle Hill Drive, Dallas, Ga. 30132

[21] Appl. No.: 657,073

[22] Filed: Feb. 11, 1976

[51] Int. Cl.² .............................................. A47C 9/10
[52] U.S. Cl. .................................................. 182/187
[58] Field of Search ............. 182/187, 188, 129, 62.1; 52/65, 80, 245; 135/1 R, 4 R, 8

[56] References Cited
U.S. PATENT DOCUMENTS

| | | | |
|---|---|---|---|
| 1,092,096 | 3/1914 | Donigan | 182/62.5 |
| 2,867,853 | 1/1959 | Lindgren | 52/80 |
| 3,358,789 | 12/1967 | Laun | 182/187 |
| 3,396,818 | 8/1968 | Moragne | 182/187 |
| 3,485,320 | 12/1969 | Jones | 182/129 |
| 3,695,390 | 10/1972 | Leigh | 182/2 |

*Primary Examiner*—Reinaldo P. Machado
*Attorney, Agent, or Firm*—Newton, Hopkins & Ormsby

[57] ABSTRACT

An observation stand used primarily for hunting deer, the stand including a supporting frame which is attached around a tree to provide a pair of vertically aligned trunions. The trunions receive a rotatable housing which can be manipulated by a person's foot. The housing also includes removeable panels, the upper panels being transparent.

10 Claims, 7 Drawing Figures

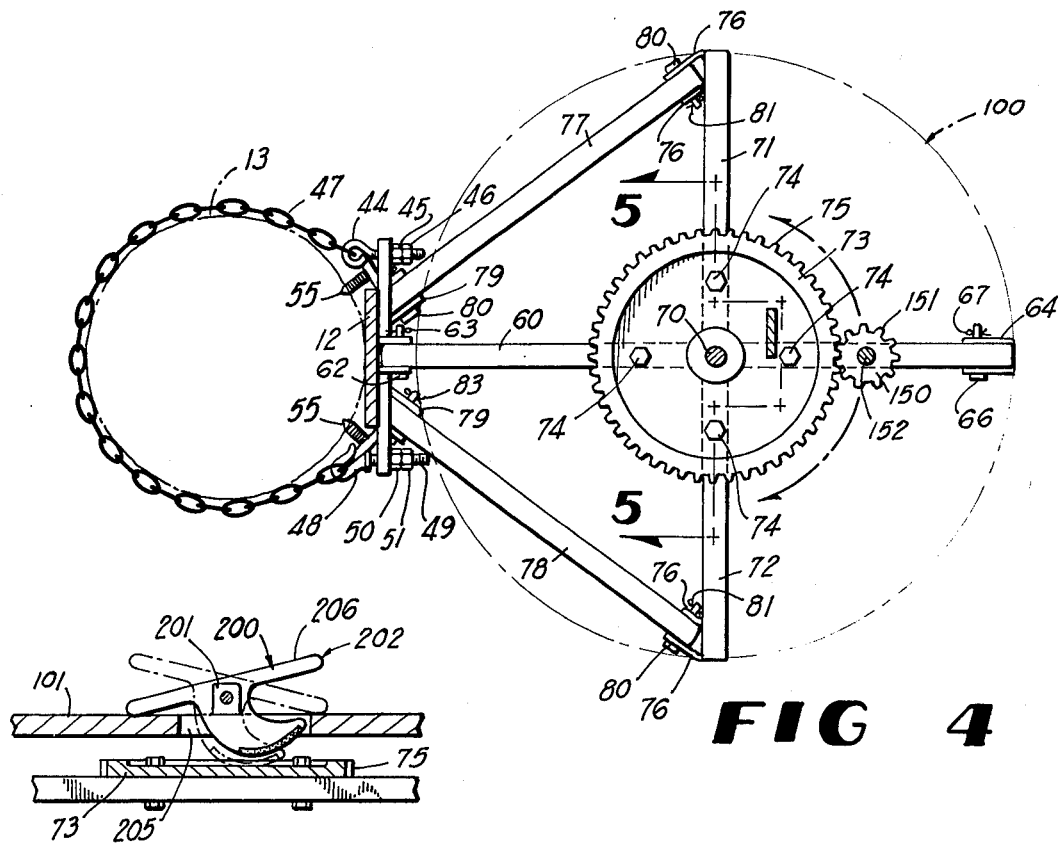
FIG 4
FIG 5
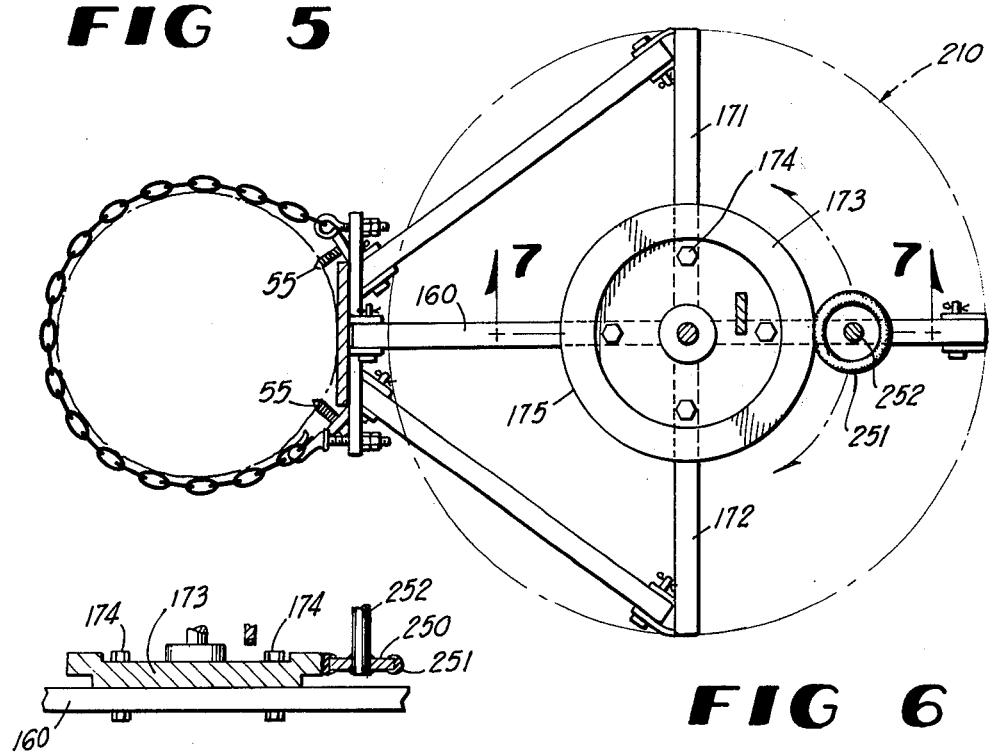
FIG 6
FIG 7

OBSERVATION STAND

BACKGROUND OF THE INVENTION

1. Field of the Invention

This invention relates to an observation stand and is more particularly concerned with a deer stand which can be mounted in a tree from assembled parts.

2. Description of the Prior Art

In the past, numerous prior art deer stands have been devised. U.S. Pat. Nos. 3,485,320; 3,358,789; 3,116,808 and 3,232,668 disclose typical prior art portable tree stands or deer stands which are carried by a tree, the hunter being seated in the stand with some protection against the weather surrounding him.

The prior art deer stands such as those described above do not provide adequate protection for the entire body of a person and provide essentially no readily accessible support for the gun. Furthermore, the prior art deer stands are not rotatable and, therefore, do not permit the hunter to remain fully enclosed in the stand while, at the same time, providing him a wide angular range for his gun.

The present invention is believed to obviate the disadvantages described above.

SUMMARY OF THE INVENTION

Briefly described, the present invention includes a frame which is assemblable on a tree, the frame providing a pair of opposed trunions in a vertical axis, the trunions carrying a tubular housing within which the hunter is seated. By manipulation of the hunter's foot, the housing is caused to be rotated on the trunions so as to position any side of the housing in any prescribed direction. The housing itself includes removeable upper and lower panels, the upper panels being transparent so that the hunter has a wide viewing area and yet is protected from extreme weather conditions.

BRIEF DESCRIPTION OF THE DRAWING

FIG. 4 is a cross sectional view taken substantially along line 4—4 in FIG. 3;

FIG. 5 is an enlarged view of a detail showing the locking mechanism of the device shown in FIG. 1;

FIG. 6 is a cross sectional view similar to FIG. 4 but showing a modified form of the present invention;

FIG. 7 is a cross sectional view taken substantially along line 7—7 in FIG. 6.

DESCRIPTION OF THE PREFERRED EMBODIMENTS

Figure 1:
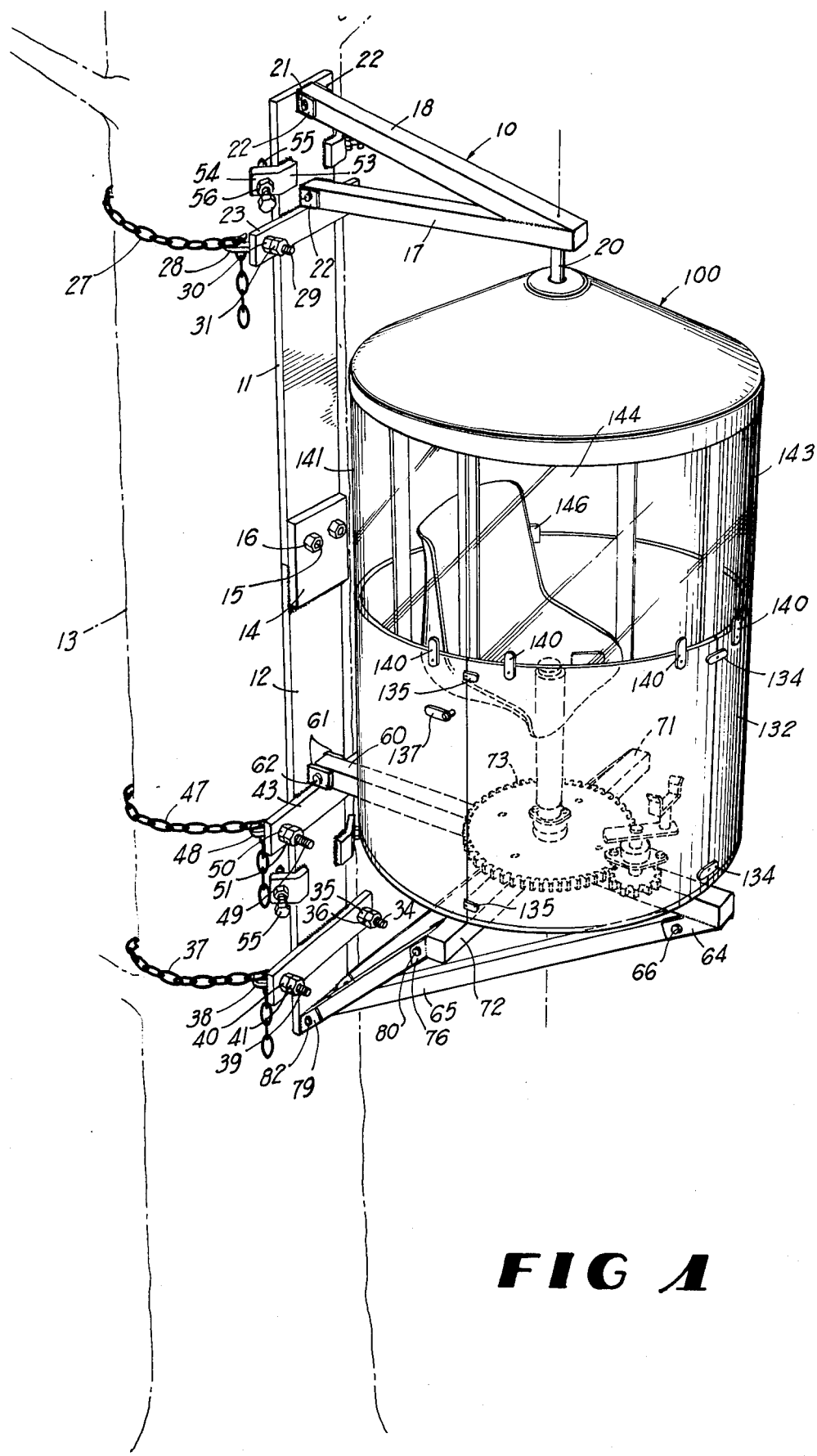
FIG. 1 is a perspective view of an observation stand constructed in accordance with the present invention.

Referring now in detail to the embodiments chosen for the purpose of illustrating the present invention, numeral 10 denotes generally the supporting frame of the observation stand of the present invention, the supporting stand including an upper base plate 11 and a lower base plate 12. Each of these base plates 11 and 12 is a flat, rectangular metal member, the lower end of base plate 11 abutting the upper end of base plate 12 in vertical alignment along the trunk 13 of a tree. For removeably securing the base plates 11 and 12 together in their vertical alignment, a small rectangular plate 14 is welded to the outer surface of the lower plate 12, so that the upper end portion of the plate 14 overlaps the lower end portion of the plate 11. Bolts 15 which pass through the overlapping portions of plates 11 and 14 receive nuts 16 so as to secure the plates 11 and 12 together.

The plate 11 is provided with an upper support bracket assembly which projects in cantilever fashion from the upper plate 11 and includes an outwardly protruding horizontal strut 17 which is welded or otherwise permanently secured to an upper strut 18, the struts 17 and 18 forming a V-shaped upper bracket for the support of a downwardly protruding trunion 20 at the apex of the struts 17 and 18. The upper bracket assembly formed by the struts 17 and 18 is removably secured to the upper plate 11 by removable bolts 21 which pass through opposed pairs of brackets 22 which protrude outwardly from the surface of the upper plate 11. The uppermost pair of brackets 22 is at the upper end of plate 11 and the lower pair of brackets 22 is at an intermediate position vertically aligned with the upper pair of brackets. The bolts 21 pass through the end portions of the struts 17 and 18, respectively, and are provided with cotter keys (not shown) for removably retaining the bolts 21 in place.

Below the lower pair of brackets 22, the plate 11 is provided with an upper securing means including a cross bar 23 which extends outwardly on both sides of the plate 11. An eyelet 24, seen in FIG. 3, passes through one of the protruding end portions of the cross bar 23 and is provided with a retaining nut 25 and a lock nut 26 on its threaded end. The eyelet 24 receives one end of the upper chain 27. The upper chain 27 thence passes around the tree 13 and is passed through a hook 28, the chain being sufficiently long that a portion of the chain hangs downwardly from the hook 28. The shank 29 of the hook passes through the other outwardly protruding end portion of the cross bar 23 and is provided with a retaining nut 30 and a lock nut 31 on the threaded end of the shank 29. It is therefore seen that, regardless of the diameter of the tree trunk 13, the chain will be received around the trunk so that one link of the chain 27 is received through the hook 28. The shank 29 permits take up of the hook 28 so that the chain 27 can be tightened, after installation in the hook 28.

In like fashion, a lower and intermediate securing means is provided for the lower plate 12, the lower securing means including a transverse cross bar 33 provided with an eyelet 34 and nuts 35 and 36, the eyelet 34 carrying a chain 37 which is received in a hook 38 having a shank 39 and nuts 40 and 41.

The intermediate securing means includes a transverse cross bar 43 above cross bar 33 and centrally of the lower plate 12, the transverse cross bar 43 having an eyelet 44 provided with nuts 45 and 46 and a chain 47. The other end portion of the chain 47 is received in a hook 48 having a shank 49 receiving nuts 50 and 51. These three securing means are substantially identical and hence no more detailed description is necessary. Suffice it to state that when the panels 11 and 12 are to be mounted on a tree, the panel 11 is taken up first and secured in place by its chain 27. Thereafter, the lower plate 12 is secured by bolts 15 and nuts 16 to the upper plate 11. Next, the chains 37 and 47 are secured on their hooks 38 and 48. The manipulation of the bolts 30, 31, 40, 41 and 50, 51 will tighten or loosen the chains 27, 37 and 47 in place, as desired.

For stabilizing the supporting frame 10 so that it does not sway and so that the plates 11 and 12 remain generally tangential to the tree trunk 13, opposed pairs of stabilizing flanges 53 are secured by welding to and protrude sidewise beyond the opposite side edges of plates 11 and 12, the flanges 53 being bent inwardly to provide tangential bolt carrying flanges 54. Pointed, externally threaded, stabilizing bolts 55 threadedly extend through the carrying flanges 54 to project into the trunk 13 at radially spaced positions. Lock nuts 56 lock the bolts in place.

Protruding in cantilever fashion from the lower plate 12 is a lower support bracket assembly including an outwardly projecting, horizontally disposed, main support strut 60 which is parallel to strut 17 and perpendicular to the plates 11 and 12. The inner end portion of strut 60 is carried between brackets 61 secured centrally on the lower plate 12, there being aligned holes in the brackets 61 and in the strut 60 to receive a bolt 62 secured in place by a cotter key 63.

The strut 60 is substantially longer than the strut 17 and is provided at its distal end with an inwardly and downwardly opening rectangular sleeve 64 into which the end portion of an upwardly and outwardly extending support strut 65 is inserted. A pin 66 provided with a cotter key 67 removably retains the strut 65 in place. The sleeve 64 forms an end cap for the strut 60 and is welded firmly in place thereon.

The proximal end of the strut 65 is carried by a pair of brackets 67, there being a pin 68 removably securing the end portion of strut 65 in place between the brackets 67, the pin 68 having a cotter key or some other means (not shown) securing the pin 68 in place. The brackets 67 are at the lower end portion of plate 12. The struts 17, 18, 60 and 65 are in vertical alignment in a plane perpendicular to the plane of the plates 11 and 12.

Vertically below the upper trunion 20 is a lower trunion 70, shown in FIGS. 3 and 4. This trunion 70 is an upstanding member mounted upon the central portion of strut 60. On opposite sides of the trunion 70, side struts 71 and 72 extend laterally from the central portion of strut 60. The upper planes of strut 60 and struts 71 and 72 are in a common horizontal plane and receive a circular gear 73 secured firmly in place on the struts by bolts 74. The teeth 75 of the gear 73 are concentric with the trunion 70.

The ends of struts 71 and 72 are provided with inwardly and downwardly extending pairs of brackets 76, the pairs of brackets 76 receiving the end portions of reinforcing struts 77 and 78, respectively. These reinforcing struts taper inwardly and downwardly and their end portions are carried by brackets 79. Removable pins 80 secure the distal ends of struts 77 and 78 in the pairs of brackets 76. Cotter key 81 retain the pins 80 in place. In like fashion, pins 82 pass through the brackets 79 and through the proximal ends of the struts 77 and 78 so as to retain these ends in place in the pairs of brackets 79, cotter pins 83 retaining the pins 82 in place.

A thrust bearing having races 90 and 91 is removably inserted on the upstanding lower trunion 70 and rests upon an upright sleeve 89, the lower end of which is welded to struts 60, 71 and 72 at their junction surrounding the lower end portion of trunion 90. The housing, denotes generally by numeral 100, is carried on the upper race 91 as will be described hereinafter.

Figure 2:
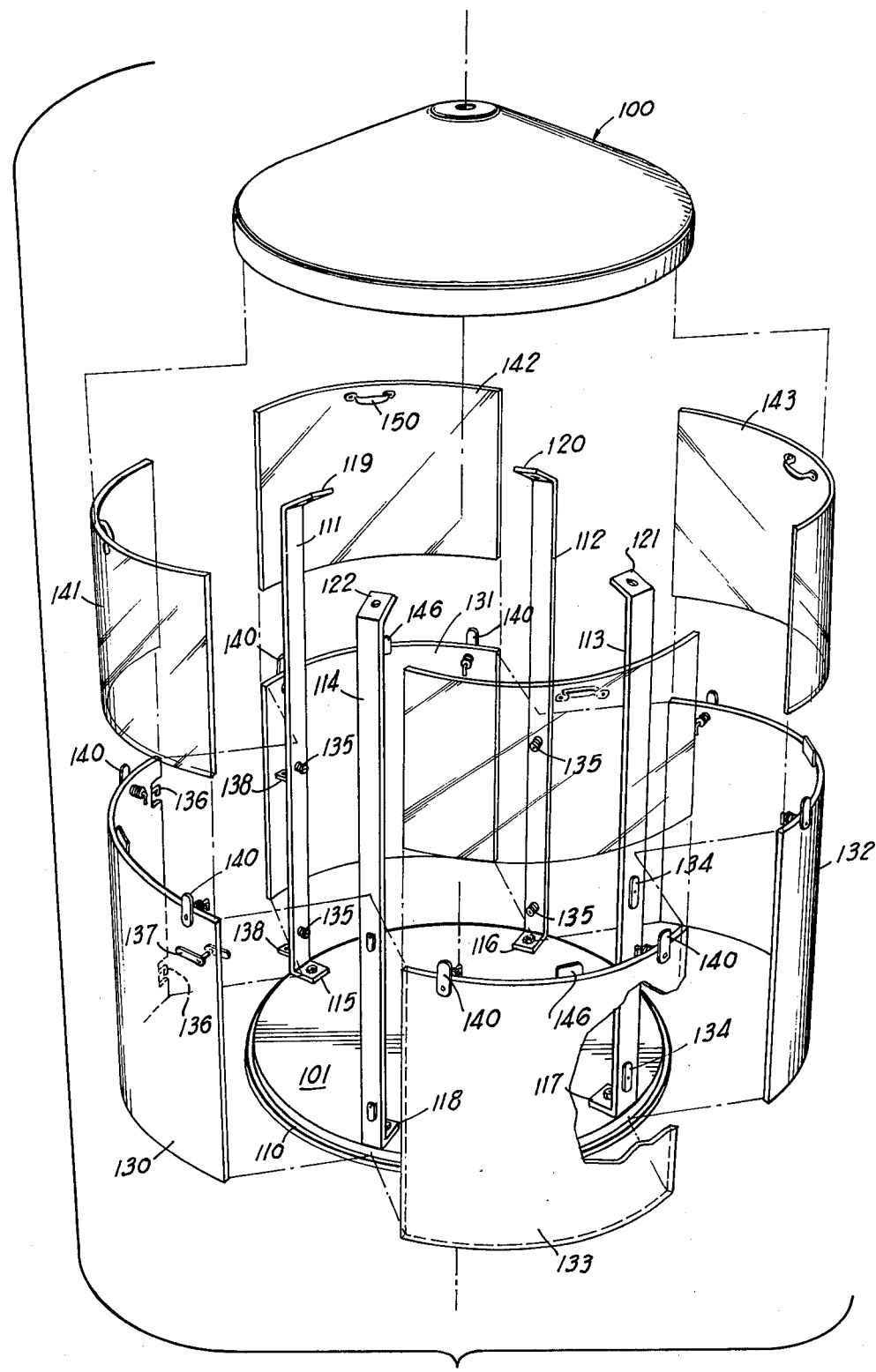
FIG. 2 is an exploded perspective view of the housing of the observation stand disclosed in FIG. 1.

As best seen in FIG. 2, the housing 100 includes a flat disc shaped floor or platform 101 which has a central hole through which the lower trunion 70 projects. Surrounding the hole in disc 101 is a lower journal plate 102 and an upper journal plate 103 bolted against the lower and upper surfaces of the central portion of the platform 101, the lower trunion 70 projects through appropriate holes in the journal plates 102 and 103 and is received in the lower portion of a hollow upstanding standard fixed by its lower end to the upper surface of bearing plate 103. The upper end portion of the standard 104 is provided with a radially extending flange 105 which provides the sole support for a curved molded plastic seat 106, the seat being secured to the flange 105 by bolts 107. The journal plates 102 and 103 sandwich the central portion of the platform 101 and are secured together by bolts 104.

As best seen in FIG. 2, the outer periphery of the platform 101 is provided with a radially extending shoulder 110, the shoulder 110 extending circumferentially around the periphery of the basic shaped platform 101. Disposed approximately 90° from each other are a plurality of upstanding body straps 111, 112, 113 and 114. Each of these straps is substantially identical in that they have inwardly turned lower ends which form feet 115, 116, 117 and 118, respectively. Also, straps 111, 112, 113 and 114 are bent inwardly to provide upwardly tapered mounting plates 119, 120, 121 and 122, respectively.

The inwardly turned feet 115, 116, 117 and 118 are respectively bolted by bolts 123 to the upper peripheral surface of the platform 101, the feet being spaced 90° from each other so as to align the outer surfaces of the straps 111, 112, 113 and 114 with the periphery of the platform 101. Bolts 124 secure the upper plates 119, 120, 121 and 122 to the inside peripheral surface portion of the conical body 125 of the roof of housing 100. The conical body 125 extends downwardly and outwardly from a flat central hub 126 and is provided with an annular skirt 127 which overlies the upper portions of the straps 111, 112, 113 and 114. The lower end portion of the upper trunion 20 carries a thrust bearing 128 which is bolted by bolts 129 to the inside surface of the hub 126.

The peripheral shoulder 110 of the platform 101 receives the lower edges of a plurality of juxtaposed, arcuate, concentric, lower, opaque body panels 130, 131, 132 and 133. For retaining the panels 131, 132 and 133 in place, there are a plurality of rotatable, spring loaded, locking lugs 134 provided along the straps 112 and 113. The outer portions of these locking lugs 131, 132, 133, 134 have retainer plates which, when the panels 131, 132 and 133 are disposed in juxtaposition with respect to each other, extend over the outside of the abutting edge portions of the adjacent panels so as to lock them both in place when the locking lugs 134 are disposed horizontally and yet permit the release of the panels 131, 132 and 133 when the locking lugs 134 are disposed vertically. Similar locking lugs 135 are provided on the straps 111 and 114; however, the outer portions of lugs 135 extend over only the side edges of panels 131 and 133, respectively, while permitting the door panel 130 to be free to swing.

The panel 130 is provided with hinge pins 136 along one side edge portion and a latching handle 137 adjacent the opposite side edge. The downwardly protruding portions of the hinge pins 136 are received in the holes of the outwardly protruding brackets 138 on the outer surface of the strap 111. Thus, the panel 136 is free to pivot from an open position to a closed position and be locked in its closed position by the pivotable handle 137, resting against the edge portion of the strap 114.

It is now seen that when the lugs 134 and 135 are disposed horizontally, as seen in FIG. 1, the panels 131, 132 and 133 are removably retained in place while the panel 130 is free to pivot outwardly as an access door, pivoting about the brackets 138 on strap 111. When, however, the panel 130 is closed and the handle 137 is manipulated so as to overlie a portion of the strap 114, the access door formed by panel 130 is closed and will remain closed until manually opened.

The panels 130, 131, 132 and 133 are provided with upstanding latching lugs 140 adjacent their upper edges so that the lower edges of the arcuate transparent upper panels 141, 142, 143, 144 are received on the upper edges of the panels 130, 131, 132 and 133. Each of the upper panels 141, 142, 143 and 144 extends through an arc of approximately 90° and each is concentric with the other so that their abutting edges overlap the straps 111, 112, 113 and 114 while their lower edges rest upon the upper edges of the panels 130, 131, 132 and 133. The height of the upper panels 141, 142, 143 and 144 is such that when resting on the lower panels 130, 131, 132 and 133 their upper edges terminate within the skirt 127 but well below the roof 125. Thus, each of the panels 141, 142, 143 and 144 may be lifted vertically by their respective handles 150 so as to be removed. It will be understood, of course, that the lugs 140 are to be rotated to a down position in order to facilitate the removal of each of the panels 141, 142, 143 and 144.

It will be understood that each of the panels 141, 142, 143 and 144 forms an individually removeable window for the upper portion of the housing and when installed is concentric with the other panels about the vertical axis of the housing 100. The panels 141, which is above the access door panel 130, is to be removed from resting upon the upper edge of the panel 130, before the door 130 is opened. When, however, the door panel 130 is closed and the window panel 141 is installed, as illustrated in FIG. 3, the skirt 127 arrests outward movement of the window panel 141 and, therefore, tends to lock the door panel 130 in its closed position.

Figure 3:
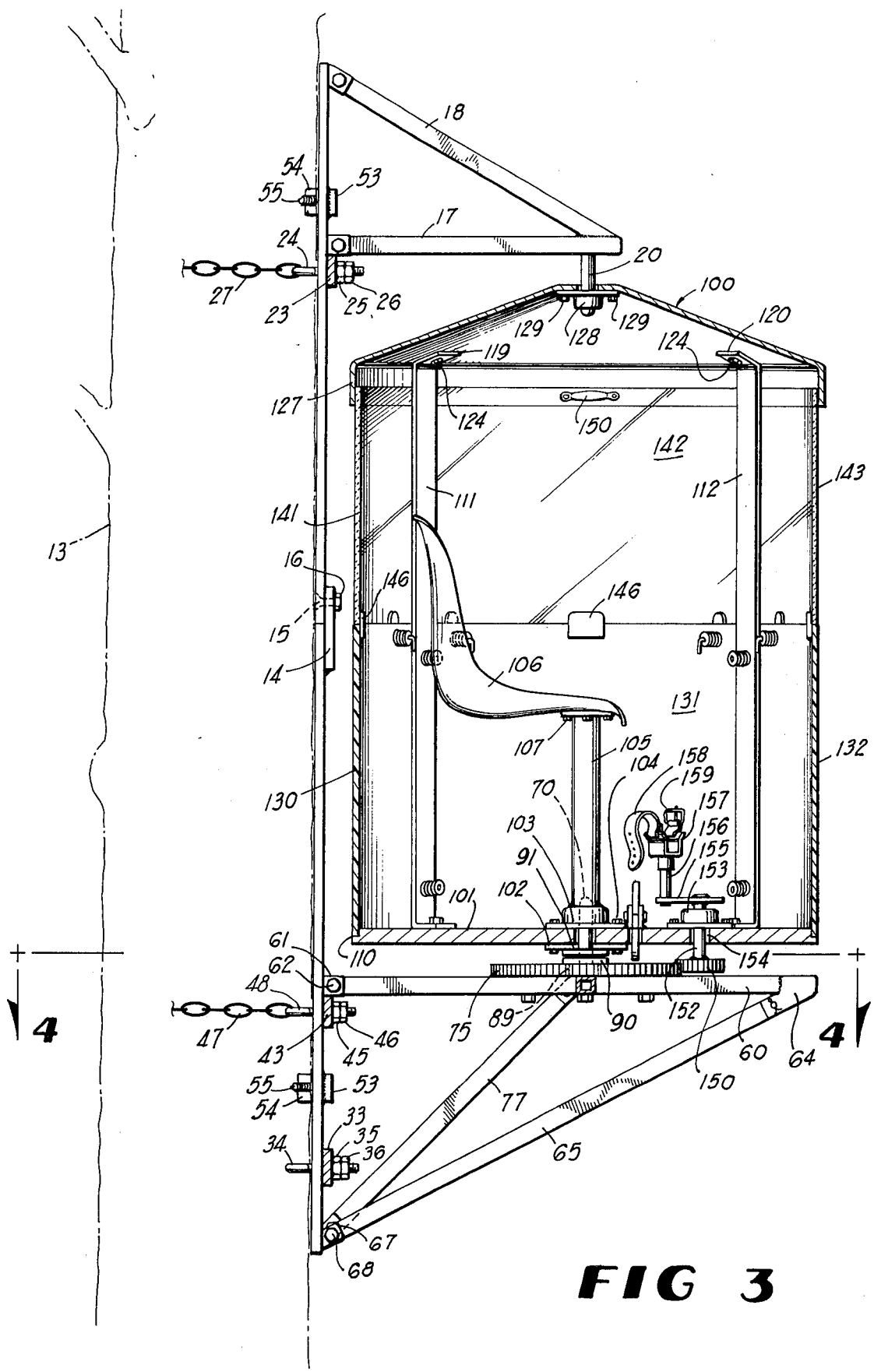
FIG. 3 is a vertical, sectional view of the housing disclosed in FIG. 1.

For the purpose of positively rotating the housing 100 about its vertical axis as defined by the aligned trunions 20 and 70, a drive pinion 150, seen in FIGS. 1, 3 and 4, is provided adjacent the grar 73 so that its teeth 151 mesh with the teeth 75 of the gear 73. The pinion 150 is carried on the lower end of a drive shaft 152 which is journalled by a bearing 153 mounted on the upper surface of the platform 101, the shaft 152 projecting through an appropriate hole 154 in the platform 101. The upper end of the shaft 152 is provided with a crank arm 155, the outer end of which is provided with an upstanding stub shaft 156, the upper end of which carries a saddle 157 into which a person seated on the seat 106 may insert his foot, the foot being retained in place by a strap 158 which is inserted through a buckle 159 of the saddle 157. By manipulation of the foot of a person in an orbital path, the crank 155 can quite readily be caused to rotate the shaft 152 to rotate the pinion 150 so as to cause the pinion to walk along the periphery of the stationary gear 73 so as to rotate the housing 100 in one prescribed direction or the other. Therefore, the housing 100 can be rotated through 360° or more so as to provide a field of vision in any direction while a person is seated on the seat 106.

If it is intended that the housing be locked in a prescribed angular position, the lock, denoted generally by numeral 200, and best seen in FIG. 5, is manipulated also by the person's foot. This lock 200 includes a pair of upstanding brackets 201 between which a friction latch 202 is disposed. The friction latch 202 is pivotally mounted by a shaft 203 between the brackets 201, its lower crescent shaped latching element 204 protruding through an appropriate opening 205 in the platform 101 so as to selectively engage and disengage the surface of the grear 73. Above the pivot pin 203, the latch 202 is provided with a flat treadle 206, by which the latch 202 may be rocked about the pivot pin 203 so as to cause the element 204 to engage or disengage gear 73, depending upon the angular position of the treadle 206.

As illustrated in full lines in FIG. 5, the latch 202 is in its unlocked position; however, if the treadle is depressed by a person's foot to the position shown in broken lines, the element 204 will frictionally engage the surface of gear 73 and, therefore, arrest further movement of the housing 100. Of course, the treadle 206 may be quite readily pivoted with a person's foot from a locked to an unlocked position and back to a locked position.

The treadle 202 is disposed between the upstanding trunion 70 and the shaft 152 so as to be in position to be engaged by the heel of the foot of a person as that foot rests in the saddle 157.

An alternate embodiment of the present invention is depicted in FIGS. 6 and 7 wherein, in place of the gear 73, a disc 173 is provided, the disc being mounted by bolts 174 on the struts 160, 171 and 172. A wheel 250 having a tire 251 around its periphery is carried by the end of a shaft 252 so that the tire 251 engages the periphery 175 of the disc 173. The structure illustrated in FIG. 6 is otherwise identical to the structure illustrated in FIG. 4 and hence no further description is necessary except to state that the frictional engagement of the tire 251 with the periphery 175 causes procession in one direction or the other of the housing 210 when the shaft 252 is rotated.

It is apparent to those skilled in the art that since the various parts of the invention described above can be readily assembled and disassembled, the parts may be transported up a tree 13, to the desired elevation, the upper plate 11 being transported up the tree first and being installed by its chain 27, as illustrated in the drawings, and then the lower plate 12 being transported up the tree and secured to the lower end of the upper plate 11 by means of bolts 15 and nuts 16. Thereafter, the chains 37 and 47 can be installed around the tree with reasonable assurance that the plates 11 and 12 will be maintained in their coplanar relationship. Thereafter, the struts 17 and 18 are installed by placing the same between the brackets 22 and passing the bolts or pins 21 through the appropriate holes therein. The struts contain the downwardly protruding upper trunion 20 and may, of desired, also contain the roof 125 carried by the thrust bearing 128 on the trunion 20. Next, the lower frame is assembled on the ground so that the struts 60, 65, 71, 72, 77 and 78 are secured together. This lower frame is then transported up the tree and positioned so that the pins 62, 68 and 82 can be installed.

Thereafter, the thrust bearing 90 is installed oer the upstanding trunion 70 and then the platform 101, containing the seat 106 is installed over the trunion 70. In such installation, the teeth 151 of pinion 150 will mesh with the teeth 75 of gear 73.

Then, the straps 111, 112, 113 and 114 are installed between the roof 125 and the platform 101. At this stage, the stand or stall is quite stable and can function without the installation of the panels. When weather is severe, the panels 130, 131, 132 and 133 as well as the panels 141, 142, 143 and 144 are installed, as described above. Usually, only a single window panel such as panel 143 is removed so that a rifle or shotgun may be pointed out of the housing. If a deer or other game comes into view, the hunter seated in the seat 106 may manipulate the foot cradle 157 so as to position the housing in a position facing this game.

The housing 100 is sufficiently large that one or several guns may be stored therein and selectively used. Thus, with rifles, the sights of several rifles can be preset for different ranges corresponding to markers set up on the ground and the appropriate rifle used when a target appears.

I claim:

1. An observation stand for installation in a tree comprising:
  a. a supporting frame for removable installation to the trunk of a tree;
  b. a housing mounted to said frame, said housing being rotatable about a vertical axis; and
  c. means on said frame and connected to said housing for supporting said housing for rotation about said vertical axis;
  d. said support frame including a bracket and a plate, said plate being adapted to be mounted against the trunk of the tree, said bracket extending outwardly from said plate in cantilever fashion, a strut supporting said bracket from said plate, said bracket being rotatably connected to said housing and supporting said housing for its rotation about said vertical axis, a second bracket extending from said plate above said housing and engaging the upper end of said housing for cooperation with the first mentioned bracket for supporting said housing by its upper and lower ends for rotation about said vertical axis, said strut and each of said brackets being removable from each other so as to be capable of being separately transported, and means for removably securing said bracket to a tree.

2. The observation stand disclosed in claim 1 including means incrementally rotating said housing about its vertical axis.

3. The observation stand defined in claim 2 wherein said means for rotating said housing includes a foot operated drive mechanism for imparting rotation to said housing said drive mechanism including a crank adjacent the floor of said housing.

4. The observation stand defined in claim 1 wherein said housing includes a plurality of removable panels forming the sides of said housing.

5. The observation stand defined in claim 4 wherein said removable panels include rigid upper and lower panels, the upper panels being transparent.

6. An observation stand comprising a circular platform a plurality of circumferentially spaced, upstanding straps extending upwardly from said platform; a roof connected to the upper ends of said straps; and a plurality of rigid removable panels carried by said straps, each of said removably panels being arcuate and including upper and lower panels, the upper panels being transparent and concentric about the vertical axis, said roof including a conical body portion and an annular skirt extending downwardly from said body portion, said skirt confining the upper end portions of the upper panels between the skirt and said straps.

7. An observation stand comprising a platform a plurality of circumferentially spaced, upstanding straps extending upwardly from said platform; a roof connected to the upper ends of said straps; a plurality of rigid removable panels carried by said straps; and a support frame for supporting said housing for rotation about a vertical axis within a tree.

8. The observation stand defined in claim 7 wherein said supporting frame includes a pair of cantilever brackets supporting the upper and lower ends of said housing.

9. The observation stand defined in claim 8 wherein said brackets are provided with trunions and bearings which support said housing for rotation about a vertical axis.

10. The observation stand defined in claim 9 including means for positively rotating said housing about said vertical axis.

* * * * *